(12) United States Patent
Wirola et al.

(10) Patent No.: US 10,444,319 B2
(45) Date of Patent: Oct. 15, 2019

(54) DETERMINING OF MODEL PARAMETERS FOR POSITIONING PURPOSES

(71) Applicant: HERE GLOBAL B.V., Eindhoven (NL)

(72) Inventors: Lauri Wirola, Tampere (FI); Jari Syrjärinne, Tampere (FI); Pavel Ivanov, Tampere (FI); Muhammad Irshan Khan, Tampere (FI); Elena-Simona Lohan, Tampere (FI); Jukka Talvitie, Tampere (FI)

(73) Assignee: HERE Global B.V., Eindhoven (NL)

( * ) Notice: Subject to any disclaimer, the term of this patent is extended or adjusted under 35 U.S.C. 154(b) by 0 days.

(21) Appl. No.: 15/580,889

(22) PCT Filed: Jun. 9, 2015

(86) PCT No.: PCT/EP2015/062777
§ 371 (c)(1),
(2) Date: Dec. 8, 2017

(87) PCT Pub. No.: WO2016/198093
PCT Pub. Date: Dec. 15, 2016

(65) Prior Publication Data
US 2018/0164400 A1    Jun. 14, 2018

(51) Int. Cl.
*G01S 5/02* (2010.01)
*H04W 4/02* (2018.01)
(Continued)

(52) U.S. Cl.
CPC .......... *G01S 5/0252* (2013.01); *G01S 5/0263* (2013.01); *G01S 19/13* (2013.01);
(Continued)

(58) Field of Classification Search
CPC ...... G01S 5/0252; G01S 5/0263; G01S 19/13; H04L 67/18; H04B 17/3911; H04W 4/023; H04W 4/026
See application file for complete search history.

(56) References Cited

U.S. PATENT DOCUMENTS

| | | | |
|---|---|---|---|
| 9,234,958 B2 | 1/2016 | Syrjarinne et al. | |
| 9,319,065 B2 | 4/2016 | Wirola et al. | |

(Continued)

FOREIGN PATENT DOCUMENTS

| | | |
|---|---|---|
| WO | WO 2013/136123 | 9/2013 |
| WO | WO 2013/136128 | 9/2013 |

OTHER PUBLICATIONS

Chen, Yu-Chi and Juang, Jyh-Ching, "Outlier-Detection-Based Indoor Localization System for Wireless Sensor Networks", International Journal of Navigation and Observation, vol. 2012, Article ID 961785.

(Continued)

*Primary Examiner* — Joseph E Dean, Jr.
(74) *Attorney, Agent, or Firm* — Alston & Bird LLP

(57) ABSTRACT

A method performed by at least one apparatus is inter alia disclosed, said method comprising: obtaining measurement data on a location-specific quantity of a signal transmitted by a transmitter; obtaining location information associated with said measurement data on said location-specific quantity; and determining, based on said obtained measurement data and said obtained location information, one or more model parameters of a model describing said location-specific quantity in dependence of location, wherein said model assumes a location dependence of said location-specific quantity in form of a combination of a first location-specific function and a second location-specific function.

24 Claims, 8 Drawing Sheets

(51) Int. Cl.
  *H04L 29/08* (2006.01)
  *H04B 17/391* (2015.01)
  *G01S 19/13* (2010.01)

(52) U.S. Cl.
  CPC .......... *H04B 17/3911* (2015.01); *H04L 67/18* (2013.01); *H04W 4/023* (2013.01); *H04W 4/026* (2013.01)

(56) References Cited

U.S. PATENT DOCUMENTS

| | | | |
|---|---|---|---|
| 9,883,352 B2 | 1/2018 | Wirola et al. | |
| 9,955,309 B2 | 4/2018 | Wirola | |
| 2003/0129992 A1 | 7/2003 | Koorapaty et al. | |
| 2005/0267677 A1 | 12/2005 | Poykko et al. | |
| 2011/0287778 A1 | 11/2011 | Levin et al. | |
| 2011/0304503 A1 | 12/2011 | Chintalapudi et al. | |
| 2013/0196681 A1* | 8/2013 | Poduri | H04W 64/00 455/456.1 |
| 2014/0171118 A1 | 6/2014 | Marti et al. | |
| 2014/0194145 A1 | 7/2014 | Do et al. | |
| 2014/0228058 A1* | 8/2014 | Ji | G01S 5/0252 455/456.5 |
| 2014/0287776 A1 | 9/2014 | Denis et al. | |
| 2015/0100743 A1 | 4/2015 | Wirola et al. | |
| 2016/0077191 A1* | 3/2016 | Julian | G01S 5/0278 342/451 |
| 2016/0295366 A1* | 10/2016 | Priyanto | H04B 7/0413 |

OTHER PUBLICATIONS

International Search Report and Written Opinion from International Application No. PCT/EP2015/062777, dated Apr. 12, 2017, 15 pages.
Konak, A., "Estimating path loss in wireless local area networks using ordinary kriging," Proceedings of the 2010 Winter Simulation Conference (WSC), pp. 2888-2896, Dec. 5-8, 2010.
Li, Xinrong, "RSS-Based Location Estimation with Unknown Pathloss Model", IEEE Transactions on Wireless Communications, vol. 5, No. 12, Dec. 2006.
Nurminen, H.; Talvitie, J.; Ali-Loytty, S.; Muller, P.; Lohan, E.; Piche, R.; Renfors, M., "Statistical path loss parameter estimation and positioning using RSS measurements in indoor wireless networks," 2012 International Conference on Indoor Positioning and Indoor Navigation (IPIN), pp. 1-9, Nov. 13-15, 2012.
Patwari, Neal, et al.; "Relative Location Estimation in Wireless Sensor Networks", IEEE Transactions on Signal Processing, vol. 51, No. 8, Aug. 2003, pp. 2137-2148.
Stein, M.L., "Interpolation of Spatial Data: Some Theory for Kriging," Springer Science & Business Media, 1999; pp. 1-4.

* cited by examiner

US 10,444,319 B2

DETERMINING OF MODEL PARAMETERS FOR POSITIONING PURPOSES

FIELD OF THE DISCLOSURE

The invention relates to the field of the determination of model parameters of a model, which may be used for positioning purposes.

BACKGROUND

Modern global cellular and non-cellular positioning technologies are based on generating large global databases containing information on cellular and non-cellular signals. The information may originate entirely or partially from users of these positioning technologies. This approach is also referred to as "crowd-sourcing".

The positioning is based on the fact, that different locations have different measurement statistics or "fingerprints". In a first phase or training phase, the users with their mobile terminals may provide information in the form of such fingerprints. The fingerprints may contain on the one hand location information that is estimated based on, e.g., received satellite signals of a global navigation satellite system (GNSS) and on the other hand measurement data taken from one or more transmitters, such as radio interfaces for signals of a cellular and/or non-cellular terrestrial system. Such measurement data may contain the received signal strength (RSS), for instance.

However, even with the help of crowd-sourcing, the collection of measurement data from transmitters requires extensive measurement campaigns and continuous updating of the acquired data base. As a result, the data collection might be limited to some specific areas, which leaves coverage gaps in the measurement data. In addition, some of the areas to be included in the data base might have restricted access preventing the possibility to collect measurement data.

Therefore, this data may then be transferred to a server or cloud, where the data may be collected and where models may be generated based on the collected data for positioning purposes. This may be a continuous background process, in which the mobile terminals continuously report measurement data to a server or they may learn the radio environment internally offline. Such models can be coverage area estimates, transmitter positions and/or radio channel models, with base stations of cellular communication system and access points of WLANs being exemplary transmitters. Thus, even areas, where measurement data is not available, can be estimated by appropriate interpolation and extrapolation methods. Here, the interpolation refers to the estimation of data values between known data values, and extrapolation refers to the estimation of data values outside the known values.

In a second phase or positioning phase, these models may be used for estimating the position of mobile terminals, for example. For instance, the position of a network user can be estimated by comparing its own measurement data with the prediction of a generated model, which was derived from the fingerprints of the first phase or training phase. The interpolation and extrapolation process enables user positioning outside the coverage area of the available measurement data, which reduces the requirements of the data collection.

However, such fingerprints do not necessarily have to comprise a GNSS based location information. They could additionally or alternatively include location information based on cellular and/or WLAN only. In this case the fingerprint could be assigned a position for example based on a WLAN based positioning in a server. Such self-positioned fingerprints can be used to learn cellular system information, in case there are cellular measurements in the fingerprint. Moreover, in a set of WLAN measurements in a fingerprint there may be, in addition to measurements for known WLAN access points, also measurements for unknown access points, and the position of the unknown access points can be learned through these self-positioned fingerprints. Finally, more data can be taken for previously known access points based on self-positioned fingerprints.

It may be noted that even when using a mobile terminal having GNSS-capabilities, a user may benefit from using cellular/non-cellular positioning technologies in terms of time-to-first-fix and power consumption. Also, not all applications require a GNSS-based position. Furthermore, cellular/non-cellular positioning technologies work indoors as well, which is generally a challenging environment for GNSS-based technologies.

To this regard, one considerable difference in indoor and outdoor positioning is the importance of the vertical direction. In outdoor positioning it is often enough to achieve horizontal position estimates using two dimensional models. However, indoors, especially in tall buildings, it is essential to have capabilities to estimate also the floor the user is located on. This leads to three dimensional data processing both in the first phase or training phase and in the second phase or positioning phase.

SUMMARY OF SOME EMBODIMENTS OF THE INVENTION

Building models and interpolation and extrapolation of measurement data can be exceptionally difficult in indoor scenarios, where the vertical dimension has to be also considered. Here, one of the most considerable problems is the difference in the structural properties of the building between horizontal and vertical directions.

Moreover, the interpolation/extrapolation task is in this case not a simple trend estimation problem, because the signal propagation is highly complex indoors. Walls, corridors, furniture and other obstacles result in high amount of shadowing compared to an outdoor propagation. Therefore, special techniques are required for providing a reliable model for such cases.

In view of this, certain aspects and embodiments according to the invention may allow for a decrease of the requirement of the measurement data collection during the first phase. Certain aspects and embodiments of the invention may improve an interpolation and extrapolation of the measurement data in three dimensions with floor losses. Certain aspects and embodiments of the invention may allow for a consideration of shadowing effects. Further, certain aspects and embodiments of the invention may provide uncertainties of the position estimate. According to certain aspects and embodiments of the invention the measurement covariance may be taken into account for improving the position estimates. Further, certain aspects and embodiments of the invention may not require heuristic parameters.

According to a first exemplary aspect of the invention, a method performed by at least one apparatus is described, the method comprising: obtaining measurement data on a location-specific quantity of a signal transmitted by a transmitter; obtaining location information associated with the measurement data on the location-specific quantity; and determining, based on the obtained measurement data and the obtained location information, one or more model parameters of a model describing the location-specific quantity in dependence of location, wherein the model assumes a location dependence of the location-specific quantity in form of a combination of a first location-specific function and a second location-specific function.

For instance, the measurement data on a location-specific quantity of a signal transmitted by a transmitter may be measured by a mobile terminal, such as a cellular phone, a laptop computer, a tablet computer, a multimedia player, a personal digital assistant, or a part thereof. For instance, the apparatus is or forms a part (e.g. as a module) of a mobile terminal.

For instance, the location information associated with the measurement data may also be determined by such a mobile terminal or a part thereof, for instance by the same mobile terminal. However, the location information may also be determined by a remote server based on said or further measurement data measured the mobile terminal.

The mobile terminal may for instance provide the measurement data and/or the location information to the apparatus(es) for performing the method according to the first aspect. The apparatus(es) may obtain the measurement data and/or the location information from the mobile terminal, for example.

Thus, the apparatus(es) to perform the method according to the first aspect or at least parts thereof can be one or more servers. A server is to be understood to mean, in particular, a data-processing unit in a network which communicates via the network with one or more data-processing units, the clients (e.g. the mobile terminals), in order to provide them with special services and/or computing power. In a client-server architecture of this type, the special services provided by the server and/or the computing power can be used by a plurality of clients so that the clients themselves, for example, have to retain less own computing power or, as another example, do not need to be provided with a larger database. A server and a client can designate both a data-processing apparatus and a program which is executed on the data-processing apparatus. The network is, for example, a local area network, a wide area network, a virtual network, a radio network, a telephony network and/or the Internet. The communication is effected, for example, in a wireless or wire bound manner.

The servers may, for example, be database servers. Examples of a database server are a Microsoft SQL Server, an Oracle server and a MySQL server. The servers may, for example, be part (for example a "component") of a so called computer cloud which makes data-processing resources available dynamically to different users via a network. A computer cloud is intended to be understood to mean, in particular, a data-processing infrastructure according to the definition of the "National Institute for Standards and Technology" (NIST) for the term "Cloud Computing". An example of a computer cloud is a Microsoft Windows Azure Platform.

However, it is also possible, that the apparatus(es) as another example may be a mobile terminal, for instance the mobile terminal itself, which measured the measurement data and determined the location information.

The location-specific quantity is in particular understood to be a quantity which varies with (and/or depends on) the location (e.g. position or orientation), at or in which it is measured. However, the location-specific quantity does not need to be unique at a certain location. Rather, there may also be multiple locations at which the same value of the location-specific quantity may be measured. The measurement data may comprise a value, which may be representative of a (characteristic) parameter of the signal of the transmitter, such as the received signal strength, for example. The measurement data may for instance derivable from the signal of the transmitter at location at which the measurement data is measured.

The transmitter may for instance be an entity (e.g. a node or a cell) of a communication system or communication network, for instance a cellular or non-cellular system or network. The transmitter may regularly or upon request transmit one or more signals. The signal may be a beacon or part of a wireless communication, for instance.

The location information associated with the measurement data on the location-specific quantity may for instance comprise or be representative of the location (or an estimate of the location) at which the measurement data was measured. It may alternatively or additionally comprise or be representative of an orientation (or an estimate thereof) of an apparatus measuring the measurement data during the measurement. The location information may for instance be representative of a certain position on the earth's surface. The location information may comprise information on a position and/or orientation in a three-dimensional space, for instance three parameters representative of a position and/or orientation in three dimensions. The location information may for instance comprise absolute values or relative values with respect to a fix point.

The measurement data and the associated location information may be stored in data sets, for instance. A data set may comprise a pair of measurement data and respective associated location information, for instance. Thus, as an example, a data base or data file may be provided comprising multiple data sets each comprising specific measurement data and the respective associated location information. For instance, the number of sets of measurement data and location information (e.g N measurement locations at which measurement data was taken) is larger than the number of model parameters to be determined.

The apparatus(es) performing the method according to the first aspect may obtain the measurement data and/or the location information for instance by receiving the measurement data and/or the location information from a mobile terminal. The apparatus(es) performing the method according to the first aspect may also obtain the measurement data and/or the location information from multiple mobile terminals, for instance. The mobile terminals may for example provide the measurement data and/or the associated location information to the apparatus(es), for instance regularly or on demand.

The model describes the location-specific quantity in dependence of location. Thus, as an example, based on the model, a value of the location-specific quantity (or the corresponding measurement data) may be predicted if location information is provided. As another example, based on the model, location information may be predicted if a value of the location-specific quantity (or the corresponding measurement data) is given. The model may be a model for at least one of interpolating and extrapolating the obtained location-specific measurement data. For instance, further measurement data can be predicted at further locations even though no measurement data is available (because no measurements were taken, for example) at the further locations.

The model may be based on one or more model parameters. For instance, the model may comprise multiple model parameters. The model parameters may be one- or multi-dimensional.

The model assumes a location dependence of the location-specific quantity in form of a combination of a first location-specific function and a second location-specific function. For instance, the (return) values of the first location-specific function and the second location-specific function depend on the location. For instance, the first location-specific function and the second location-specific function depend on one or more variables, wherein at least one variable is the location. Thus, the first and/or second location-specific function may be understood as a spatially varying function. The first location-specific function and the second location-specific function may be considered independent. For instance, the first and the second location-specific function may describe or relate to different physical phenomena related to the propagation of the signals transmitted by the transmitter.

For instance, the first location-specific function may be based on at least one model parameter. For instance, the second location-specific function may also be based on at least one model parameter. Preferably, the first and second location-specific functions each depend on multiple model parameters.

However, the model is not limited to a first and a second location-specific function. The model may also be based on further functions, for instance a third location-specific or function, or on further terms, such as a location independent variable. However, it is preferred, when the model assumes a location dependence of the location-specific quantity only in form of a combination of a first location-specific function, a second location-specific function and an optional location independent variable.

The approach according to the exemplary aspect of the invention may provide an improved model of the measurement data in dependence of location. Multiple advantages may be achieved in this way. In particular, due to a partitioning or split-up of the model into a first location-specific function and a second location-specific function, the determination of the model parameters may be done in two separate (for instance consecutive) stages. This allows for an individual adaption of the first and the second location-specific function. The approach allows in particular for an economical computation of the model parameters even in complex scenarios, such as indoor positioning.

According to an exemplary embodiment of the method according to the first aspect, the combination of the first location-specific function and the second location-specific function is a linear combination of the first location-specific function and the second location-specific function. For instance, the model may be defined as $$P(\underline{x}) = G(\underline{x}) + \Psi(\underline{x}) + v,$$

wherein $P(\underline{x})$ represents the measurement data of the location-specific quantity with $\underline{x}$ being a location variable. $G(\underline{x})$ represents the first location-specific function, whereas $\Psi(\underline{x})$ represents the second location-specific function. The first and second location-specific function depend on the location variable $\underline{x}$. The term $v$ may be provided as a location independent component of the model, which does not depend upon $\underline{x}$. The term $v$ may be a zero mean variable, accounting for zero mean white Gaussian measurement noise, for instance. The linear combination of functions may facilitate the computation and computational resources for determining model parameters of the model.

According to an exemplary embodiment of the method according to the first aspect, the determining of the model parameters comprises determining at least a part of the model parameters associated with the first location-specific function; and subsequently determining at least a part of the model parameters associated with the second location-specific function. The model, which allows for a subsequent determination of model parameters, may further reduce the computational costs for determining the model parameters and using the model for positioning purposes. For instance, in a first step all necessary model parameters associated with the first location-specific function are determined and subsequently in a second step all necessary model parameters associated with the second location-specific function are determined. The determination can for instance be seen as a two-step or two-stage determination. For instance, the determination of the model parameters associated with the second location-specific function may require the prior determination of all or some of the model parameters of the first location-specific function.

After determining the model parameters associated with the first location-specific function, the variance and/or covariance of the determined model parameters may be calculated, for instance a covariance matrix of the determined model parameters.

According to an exemplary embodiment of the method according to the first aspect, the first location-specific function describes a global trend of the location dependence of the location-specific quantity in the model. For instance, a global trend may be understood as a global behavior or tendency of the first location-specific function in dependence of location. For instance, the first location-specific function may determine or dictate the global trend of the location dependence of the location-specific quantity in the model. For instance, the first location-specific function may be characteristic for the global trend of the location dependence of the location-specific quantity in the model. For instance, the term global may be understood in comparison to the second location-specific function, which may not describe a global trend or behavior of the location dependence of the location-specific quantity. For instance, the first location-specific function may have a larger influence on the over-all location dependence of the location-specific quantity in the model than the second location-specific function. For instance, the first location-specific function may be based on a logarithmic function.

According to an exemplary embodiment of the method according to the first aspect, the first location-specific function is based on a radio propagation model. The radio propagation model may for instance be the log-distance path loss model. The log-distance path loss model predicts the path loss of a signal over distance. This model is particularly advantageous for indoor areas or densely populated areas. However, other radio propagation models or combinations thereof may also be used. As an example, the first location-specific function may be defined as $$G_0(\underline{x}) = A - 10n \log_{10}(\|\underline{x} - \underline{x}_{AP}\|).$$

In this case, the first location-specific function depends on the location $\underline{x}$ and has three model parameters, wherein A is the path loss or the observed power level at a reference distance (e.g. the power level (e.g. in dB ref 1 mW) at, for example, one meter distance from the transmitter), n is the path loss exponent and $\underline{x}_{AP}$ is the location (for instance in three dimensions) of the transmitter transmitting the signal (e.g. an access point or a base station).

According to an exemplary embodiment of the method according to the first aspect, a-priori information is imposed on at least a part of the model parameters associated with the first location-specific function. For instance, this may prevent the model parameters from taking physically impossible values. In particular, the a-priori information may help to better determine model parameters, for which no a-priori information is available. For instance, the a-priori information may define specific values for the respective model parameters or intervals of possible values for the respective model parameters. For instance, the a-priori information may be independent from the measurement data.

According to an exemplary embodiment of the method according to the first aspect, the a-priori information is based on at least one of: legislative requirements; technical requirements; and empirical values. For instance, legislative requirements may limit values of model parameters even though other values would be technically or physically possible. For instance, the maximum transmission power of the transmitter may be limited by legislative requirements. Thus, the a-priori information may provide an upper limit for respective model parameters. For instance, technical requirements may limit values of model parameters even though other values would be allowed.

For instance, the transmission power of the transmitter may have a minimum transmission power in order to allow for a technically sensible use. Thus, the a-priori information may provide a lower limit for respective model parameters. As a further example, the a-priori information may be limited by empirical values. Empirical values may be taken from the literature, for example. For instance, a-priori information in form of literature values may be chosen for model parameters such as a path loss exponent, which depends on the radio propagation environment.

According to an exemplary embodiment of the method according to the first aspect, a-priori information is not directly imposed on at least one of the model parameters associated with the first location-specific function, in particular model parameters representative of a location of the transmitter. For instance, there is no direct a-priori information available for at least one of the model parameters associated with the first location-specific function, when the model parameters are determined. However, due to (direct) a-priori information available for one or more other model parameters (as explained above) and due to the interconnection of the model parameters via the model, this may indirectly also provide indirect a-priori information on the one or more model parameters, where there is no direct a-priori information available. By using (direct) a-priori information for the other model parameters associated with the first location-specific function, a determination of all model parameters associated with the first location-specific function can be achieved even without (direct) a-priori knowledge on all model parameters. In particular, no (direct) a-priori information is used for model parameters representative of a location of the transmitter, such as $x_{AP}$, for instance. Mathematically this can be achieved by having a sufficiently large covariance (e.g. considerably larger than for the other parameters where direct a-priori information is available) for the initial value of $x_{AP}$.

However, as the model parameters may not be fully known in advance, but their values may only be approximated, at least a part of the model parameters associated with the first location-specific function may be considered Gaussian distributed random variables. For instance, the model parameters may be assigned a value and a variance and/or covariance.

According to an exemplary embodiment of the method according to the first aspect, the first location-specific function accounts for a different propagation of the signal in the vertical direction (e.g. z-direction), for instance compared to the propagation in the horizontal direction (e.g. x- and/or y-direction). For instance, the first location-specific function comprises a term for considering a propagation of the signal through different floors of a building. The term may be a floor loss term. The floor loss term may (only) depend on the vertical component (z-component) of the location, for instance. Taking above example of the first location-specific function, it may be modified to be $G(\underline{x}) = G_0(\underline{x}) - F(\Delta f)$, with $F(\Delta f)$ being the floor loss term and $\Delta f$ being an integer describing the difference of floors between the transmitter location and the measurement location. For this, it may be assumed that the floor height is known. As a further simplification, it may also be assumed that the floor height is constant between different floors.

According to an exemplary embodiment of the method according to the first aspect, the determination of the model parameters associated with the first location-specific function comprises choosing starting values for the model parameters associated with the first location-specific function; and using an iterative algorithm for determining the model parameters associated with the first location-specific function. The starting values (or a-priori values) for the model parameters associated with the first location-specific function may be chosen randomly, for example. However, the starting values of at least some model parameters associated with the first location-specific function may also be limited by the a-priori information, as explained above. The model parameters associated with the first location-specific function may be approximated stepwise. For instance, a vector with the current parameter estimates $\underline{m}$ may be approximated by adding the step length $\Delta \underline{m}$ of the current step (optionally multiplied by a (predefined or adaptively derived) design parameter). The iterative algorithm may be stopped if a stopping criterion is fulfilled. For instance, the stopping criterion may be based on a calculation result of the current step of the algorithm. For instance the stopping criterion may be based on one or more of: a current step length, e.g. an absolute step length (e.g. $\|\Delta \underline{m}\|$) or a relative step length (e.g. $\|\Delta \underline{m}\|/\|\underline{m}\|$), a change of the current step length, e.g. by comparing the step length between two (consecutive) steps, a number of already performed iterations, a model error estimate, e.g. an absolute model error (e.g. $\|\underline{r}\|$) or a relative model error (e.g. $\|\underline{r}\|/\|P\|$) and a change of the model error estimate, e.g. by comparing the model error estimate between two (consecutive) steps. The iterative algorithm may be stopped in case any of the above parameters is small enough, for example smaller than a predefined stopping tolerance parameter.

Preferably, the determination of the model parameters associated with the first location-specific function comprises a non-linear least squares algorithm. For example the algorithm may be a weighted non-linear least square algorithm. For instance, the algorithm accounts for the covariance of the measurement data. As an example, the determination of the model parameters associated with the first location-specific function is based on a Gauss-Newton algorithm.

According to an exemplary embodiment of the method according to the first aspect, the determining of the model parameters associated with the first location-specific function is repeated with different starting values of the model parameters associated with the first location-specific function. For instance, the determination is repeated at least once. For instance, at least a part of the starting values of the model parameters associated with the first location-specific function is changed, for example at least the starting value for the model parameter representative of a location of the transmitter. For instance, the different starting values for the model parameters associated with the first location-specific function can be different initial guesses. For instance, after repeating the determination of the model parameters associated with the first location-specific function for the different starting values, a set of model parameters associated with the first location-specific function may be chosen, for which the error is smallest (that is the model parameters which best describe the measurement data in dependence of the location information).

According to an exemplary embodiment of the method according to the first aspect, the model parameters associated with the first location-specific function comprise or are representative of at least one of: a path loss constant; a pass loss exponent; a location of said transmitter; and a floor loss parameter. However, the model parameters associated with the first location-specific function may also include different or further parameters. The model parameters will generally depend upon the model chosen for the first location-specific function.

According to an exemplary embodiment of the method according to the first aspect, the determining of the model parameters comprises determining the reliability of at least a part of the determined model parameters associated with the first location-specific function; and determining at least a part of the model parameters associated with the second location-specific function only if the reliability of at least a part of the determined model parameters associated with the first location-specific function is above a predetermined reliability threshold. For instance, determining at least a part of the model parameters associated with the second location-specific function may only be performed if the reliability threshold for all determined model parameters associated with the first location-specific function is above a respective predetermined reliability threshold. This may prevent further computations which may lead to model parameters associated with the second location-specific function which cannot be used due to a too large error or variance of the model parameters.

According to an exemplary embodiment of the method according to the first aspect, the second location-specific function describes local variations of the location dependence of the location-specific quantity in the model. For instance, the second location-specific function may determine or dictate a local behavior of the location dependence of the location-specific quantity in the model. For instance, the second location-specific function may be characteristic for local variations of the location dependence of the location-specific quantity in the model. For instance, the term local may be understood in comparison to the first location-specific function, which may not describe (only) local variations or behavior of the location dependence of the location-specific quantity, but a global trend or behavior. For instance, the second location-specific function may have a smaller (or no) influence on the over-all location dependence of the location-specific quantity in the model than the first location-specific function. For instance, the second location-specific function may be based on an exponential function. For instance, the second location-specific function may describe fading, in particular shadow fading or shadowing. Fading is understood to mean a deviation of the attenuation affecting a signal during its propagation, and shadow fading or shadowing is understood to describe shadowing from obstacles affecting the signal propagation.

According to an exemplary embodiment of the method according to the first aspect, the second location-specific function is based on a covariance function. For instance, the covariance function is simple stationary parametric covariance function, for instance an exponential covariance function. Preferably, the second location-specific function is a zero mean function. For instance, the covariance function may be defined as $$\Phi(d) = \sigma_0^2 \exp(-d/d_{corr}),$$

wherein the distance d defines the covariance between two sets of measurement data at two locations separated by d, $\sigma_0$ is the square root of the covariance at zero distance, and $d_{corr}$ is a design parameter affecting the shape of the covariance function. It can be noted, that the larger the parameter $d_{corr}$ the more nearby measurements affect each other in the model.

According to an exemplary embodiment of the method according to the first aspect, the determining of the model parameters of the second location-specific function is based on residuals of at least a part of the obtained measurement data on the location-specific quantity. For instance, the residuals of the obtained measurement data on the location-specific quantity are understood to be the residuals after the first location-specific function has been removed from the obtained measurement data on the location-specific quantity. Thus, the residuals can be seen as residual measurement data. As an example, the residuals may be defined as $$\Psi(\underline{x}_i) = P_i(\underline{x}_i) - G_{est}(\underline{x}_i),$$

wherein $G_{est}$ denotes the estimated first location-specific function with the determined model parameters associated with the first location-specific function and the index $i=1 \ldots N$ denotes the different obtained measurement data $P_i$ at the different locations $x_i$.

According to an exemplary embodiment of the method according to the first aspect, the second location-specific function is a weighted linear combination of the residuals of the obtained measurement data on the location-specific quantity. For instance, the determination of the model parameters of the second location-specific function is based on a method of at least one of interpolation and extrapolation for which the interpolated/extrapolated values are modeled by a Gaussian process governed by prior covariances. For instance, the determination of the model parameters of the second location-specific function is based on Kriging, also called Gaussian process regression. As an example, the estimated second location-specific function may be written as $$\Psi_{est}(\underline{x}) = \Sigma_{i=1 \ldots N} w_i(\underline{x}, \underline{x}_i) \Psi(\underline{x}_i),$$

where $w_i$ can bee seen as the weighting factor, which is for instance based on the covariance function.

According to an exemplary embodiment of the method according to the first aspect, the transmitter is part of one of: a cellular communication system and a non-cellular communication system.

A cellular communication system is for instance a second generation (2G, for instance the Global System for Mobile Communication (GSM), the General Packet Radio System (GPRS), the Enhanced Data Rates for GSM Evolution (EDGE) or the High Speed Circuit-Switched Data (HSCSD)), third generation (3G, for instance the Universal Mobile Tele-communication System, UMTS, WCDMA, TD-SCDMA or CDMA-2000), fourth generation (4G, for instance the Long Term Evolution, LTE, system, the LTE Advanced (LTE-A) system or the IEEE 802.16m WiMAX system), or fifth generation (5G, for instance the Next Generation Mobile Networks, NGMN system) communication system.

A non-cellular (radio) communication system is for instance a WLAN network, a Bluetooth (LE) system, a ZigBee system, a radio-frequency identification (RFID) system, a broadcasting system such as for instance Digital Video Broadcasting (DVB), Digital Audio Broadcasting (DAB) or Frequency-Modulated (FM)/Amplitude-Modulated (AM) radio, a Near Field Communication (NFC) system, etc.

A cellular communication system may for instance be characterized by a basically seamless pavement of a geographical area (usually in the order of at least hundreds or thousands of square kilometers) with cells in which coverage is provided by respective nodes of the communication system that are operated by the same operator, which system may for instance support communication handover between cells. Consequently, a non-cellular communication system may be characterized as a communication system that does not have all of these properties.

For instance, the transmitter may be a node or a cell of the above cellular communication systems or a node of the above non-cellular communication systems, such as an access point or a base station, for example a WLAN AP/BS, for instance according to one or more of the IEEE 802.11 family of standards. A WLAN may for example operate on a single frequency band (2.4 GHz according to IEEE 802.11b/g or 5.0 GHz according to IEEE 802.11a/h, representing the two frequency bands 2.4-2.4835 GHz, and 5.15-5.725 GHz, respectively), or on two frequencies bands (2.4 GHz and 5.0 GHz according to IEEE 802.11n, again representing the two frequency bands 2.4-2.4835 GHz, and 5.15-5.725 GHz, respectively).

According to an exemplary embodiment of the method according to the first aspect, the measurement data on the location-specific quantity is representative of or comprises at least one of: a signal strength; a timing measurement; an angle of arrival; a timing measurement, a magnetic field strength and/or direction; and an identification of the transmitter.

For instance, in the case of measurements on cellular signals, the measurement data may contain their (emitted/received) signal strengths and/or path losses and/or timing measurements like propagation delay, timing advance (TA) or round-trip time (RTT). Further, the measurement data may alternatively or additionally contain an angle of arrival (AOA) of the signal and/or a magnetic field strength and/or a magnetic field direction of the signal. Alternatively or additionally, the measurement data may contain a global and/or local identification of the cellular transmitters or cells observed. Non-limiting examples of an identification are cellular cell identifiers (e.g. a Mobile Country Code (MCC), a Mo-bile Network Code (MNC), a Local Area Code (LAC) and/or a Cell Identity (CID) in case of coverage areas of a 2G mobile communications system, a UTRAN Cell ID (UC-ID) in case of a 3G mobile communications system, or an LTE Cell Identity in case of a 4G communications system).

For measurements on wireless local area network (WLAN) signals, as an example of signals of a non-cellular system, the measurement data may contain the signal strength of received signals (received signal strength indication RSSI or physical Rx level in dBm with a reference value of 1 mW, for example). The measurements may alternatively or additionally contain a basic service set identification (BSSID), like the medium access control (MAC) address of observed access points (APs), the service set identifier (SSID) of the access points as examples of an identification of the transmitter.

According to an exemplary embodiment of the method according to the first aspect, the location information is derived from at least one of: a Global Navigation Satellite System (GNSS); a Wireless Local Area Network (WLAN) system; a Bluetooth (BT) system; a Radio Frequency Identification (RFID) system; a cellular network system; one or more sensors; and a manual input. For instance, the location information may be determined by the apparatus (e.g. a mobile terminal), which is also measuring the measurement data on the location-specific quantity of the signal transmitted by the transmitter, for instance at the same time or at a similar time. The sensor may for instance be an accelerometer, a gyroscope, a magnetometer, a barometer or any other sensor suitable for providing or deriving location information. A manual input may be performed by the user (e.g. of the mobile terminal). For instance, the user may use a digital map to input current location information.

According to a second exemplary aspect of the invention, a computer program code is described, the computer program code when executed by a processor causing an apparatus to perform the actions of the method according to the first aspect (and/or any of its embodiments described herein).

According to a third exemplary aspect of the invention, a (e.g. non-transitory and/or tangible) computer readable storage medium is described in which computer program code according to the second aspect (and/or any of its embodiments described herein) is stored. The computer readable storage medium could be for example a disk or a memory or the like. The computer program code could be stored in the computer readable storage medium in the form of instructions encoding the computer-readable storage medium. The computer readable storage medium may be intended for taking part in the operation of a device, like an internal or external hard disk of a computer, or be intended for distribution of the program code, like an optical disc.

According to a fourth exemplary aspect of the invention, an apparatus is described configured to realize or comprising respective means for realizing the method according to the first aspect (and/or any of its embodiments described herein). The means of these apparatuses can be implemented in hardware and/or software. They may comprise for instance a processor, e.g. for executing computer program code for realizing the required functions, a memory storing the program code, or both. Alternatively, they could comprise for instance circuitry that is designed to realize the required functions, for instance implemented in a chipset or a chip, like an integrated circuit.

According to a fifth exemplary aspect of the invention, an apparatus is described comprising at least one processor and at least one memory including computer program code, the at least one memory and the computer program code configured to, with the at least one processor, cause an apparatus at least to perform the method according to the first aspect (and/or any of its embodiments described herein).

Any of the described apparatuses may comprise only the indicated components or one or more additional components. Any of the described apparatuses may be a module or a component for a device, for example a chip. Alternatively, any of the described apparatuses may be a device, for instance a server or a mobile terminal. Any of the described apparatuses may for instance at least comprise a user interface, a communication interface and/or an antenna.

In particular, any of the apparatuses may be one of a server or a part thereof; and a mobile terminal or a part thereof.

According to a sixth exemplary aspect of the invention, a system is described comprising an apparatus according to the fourth or fifth aspect (and/or any of its embodiments described herein), and at least one of: a mobile device configured to provide the measurement data on the location-specific quantity of the signal from the transmitter and to provide the location information associated with the measurement data on the location-specific quantity; a memory configured to store the measurement data on the location-specific quantity of the signal from the transmitter and to store location information associated with the measurement data on the location-specific quantity; and a memory configured to store the determined model parameters of the model describing the location-specific quantity in dependence of location.

The features and example embodiments of the invention described above may equally pertain to the different aspects according to the present invention.

It is to be understood that the presentation of embodiments of the invention in this section is merely exemplary and non-limiting.

Other features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

DETAILED DESCRIPTION OF THE FIGURES

Figure 1:
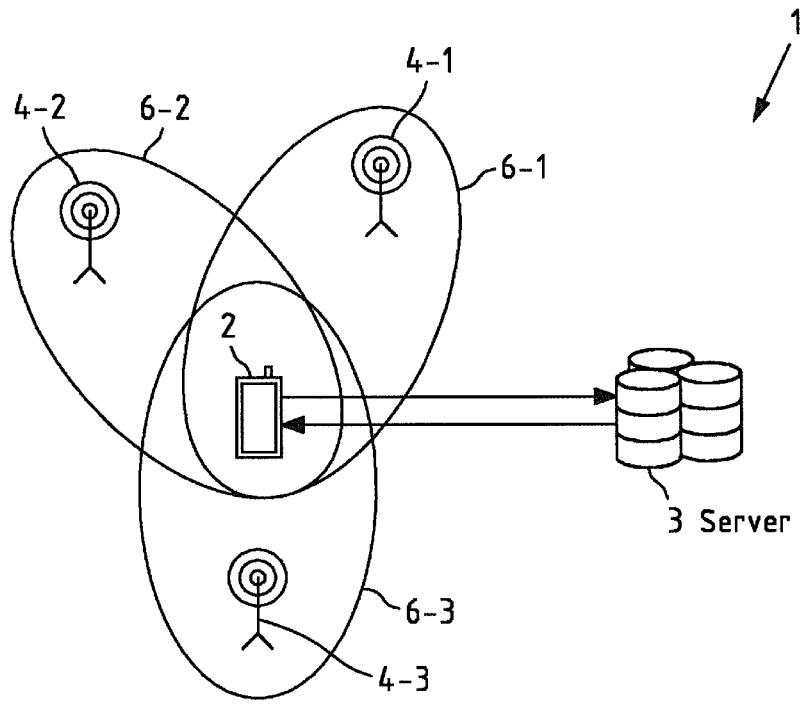
FIG. 1 is a schematic illustration of a mobile terminal determining measurement data of the received signal strength of a transmitter and determining location information.

FIG. 1 illustrates an apparatus 2 in form of a mobile terminal determining measurement data of the received signal strength of a transmitter 4-1 and determining location information. The components of the mobile terminal 2 are described in more detail with respect to FIG. 2. In FIG. 1, mobile terminal 2 is configured to determine the retrieved signal strength as a location-specific quantity of the signal from transmitter 4-1 of a communication system, as transmitter 4-1 provides radio coverage in the respective coverage area 6-1. At different positions within the coverage area 6-1, the mobile terminal 2 would measure different received signal strengths, which results in the received signal strength being a location-specific quantity. Thus, the mobile terminal 2 is able to determine measurement data on the received signal strength and, for example, store the measurement data. As already described, non-limiting examples of transmitters of communication systems are cells, nodes or base stations (or sectors thereof) of a cellular communication system, such as for instance a 2G, 3G or 4G communication system, or a node (e.g. an access point AP or base station BS) or a beacon of a non-cellular communication system, such as for instance a WLAN network.

The mobile terminal 2 is also configured to determine location information associated with said measurement data. For instance, the mobile terminal 2 may determine location information, e.g. its position, based on a Global Navigation Satellite System (GNSS), for example (not shown). However, in particular for indoor situations, there may be no reception of GNSS signals or the GNSS signals may be too weak in order to get reliable location information. Therefore, additionally or as an alternative, it is possible that the mobile terminal 2 determines location information based on other sources. As an example, the mobile terminal 2 may use the signals of the transmitters 4-2, 4-3 to determine location information. The transmitter 4-2, 4-3 may be part of the same or a different communication system than transmitter 4-1. For instance, the mobile terminal already has information about transmitter 4-2, 4-3. For instance, based on models of the coverage areas and/or radio channel models of the transmitters 4-2 and 4-3, the mobile terminal 2 may be capable of determining location information (e.g. its position), for instance as an intersection of coverage areas 6-2 and 6-3, to name a non-limiting example. Thus, the mobile terminal 2 is able to determine location information and, for example, store the location information. As another example, the location information may alternatively or additionally pertain to an orientation of the mobile terminal 2, which may be determined based on an angle of arrival of the signals from the known transmitters 4-2, 4-3 or based on sensors of the mobile terminal 2.

Figure 4:
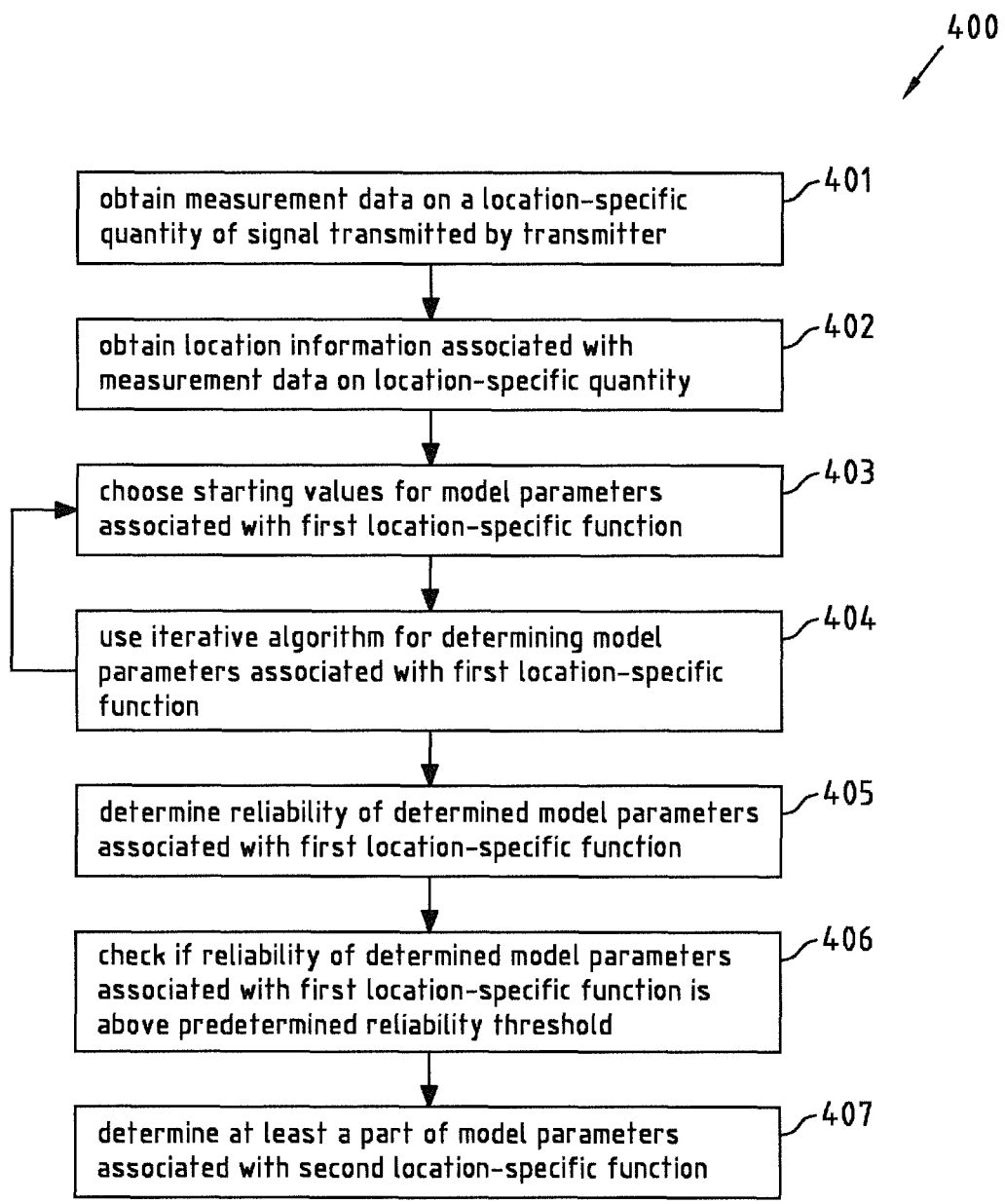
FIG. 4 is a flow chart illustrating an exemplary embodiment of a method according to the invention for instance performed by an apparatus of FIG. 2 or FIG. 3.

Thus, mobile terminal 2 is configured to determine (and store) measurement data of the received signal strength of transmitter 4-1 as a location-specific quantity and to determine location information, e.g. by using signals of transmitters 4-2, 4-3. The mobile device may repeat this determination for different locations. The mobile terminal 2 can thus obtain the measurement data and the location information and may perform embodiments of the method according to the invention (e.g. as shown in FIG. 4) by itself.

However, it is preferred that the collected measurement data and the respective location information is sent to the server 3. Accordingly, server 3 may receive and thus obtain the measurement data and the location information from mobile terminal 2. The components of the server 3 are described in more detail with respect to FIG. 3. The measurement data and the respective location information may be sent from mobile terminal 2 to server 3 via the internet, for example. As an example, the mobile terminal 2 may sent one or more data files comprising one or more sets of measurement data and respective location information to server 3. Server 3 may then perform embodiments of the method according to the invention, as will be explained in further detail with respect to FIG. 4.

Figure 2:
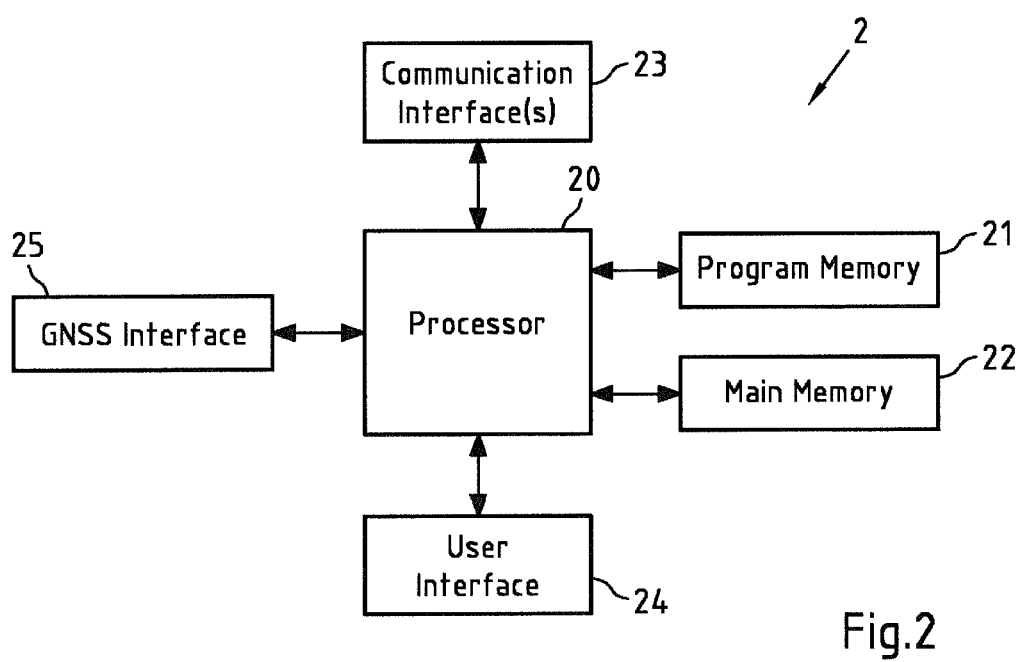
FIG. 2 is a block diagram of the apparatus 2 of FIG. 1.

FIG. 2 is a block diagram of an apparatus 2, e.g. of the mobile terminal 2 of FIG. 1. The apparatus 2 is an example embodiment of an apparatus according to the invention. For instance, the apparatus 2 is or forms a part (e.g. as a module) of a mobile terminal, e.g. mobile terminal 2 of FIG. 1. Non-limiting examples of a mobile terminal are a cellular phone, a personal digital assistant, a laptop computer, a tablet computer or a multimedia player.

Apparatus 2 comprises a processor 20. Processor 20 may represent a single processor or two or more processors, which are for instance at least partially coupled, for instance via a bus. Processor 20 executes a program code stored in program memory 21 (for instance program code causing apparatus 2 to perform one or more of the embodiments of a method according to the invention (as for instance further described below with reference to FIG. 4), when executed on processor 20), and interfaces with a main memory 22. Some or all of memories 21 and 22 may also be included into processor 20. One of or both of memories 21 and 22 may be fixedly connected to processor 20 or at least partially removable from processor 20, for instance in the form of a memory card or stick. Program memory 21 may for instance be a non-volatile memory. It may for instance be a FLASH memory (or a part thereof), any of a ROM, PROM, EPROM and EEPROM memory (or a part thereof) or a hard disc (or a part thereof), to name but a few examples. Program memory 21 may also comprise an operating system for processor 20. Program memory 20 may for instance comprise a first memory portion that is fixedly installed in apparatus 2, and a second memory portion that is removable from apparatus 2, for instance in the form of a removable SD memory card. One or more sets of position information, for instance in a database, that are useable by apparatus 2 to determine positions may for instance be stored in program memory 21. Main memory 22 may for instance be a volatile memory. It may for instance be a RAM or DRAM memory, to give but a few non-limiting examples. It may for instance be used as a working memory for processor 20 when executing an operating system and/or programs.

Processor 20 further controls a communication interface 23 configured to receive and/or output information. For instance, communication interface 23 may be configured to receive signals, to exchange information with and/or to identify entities 4-1, 4-2 and/or 4-3 of system 1 of FIG. 1, and/or to exchange information with server 3 of system 1 (see FIG. 1). This may for instance comprise sending measurement data and location information (or a part thereof) to server 3 and/or receiving data of a database (or part thereof), for instance model information (or a part thereof) from server 3. The communication may for instance be based on a wireless connection. Communication interface 23 may thus for instance comprise circuitry such as modulators, filters, mixers, switches and/or one or more antennas to allow transmission and/or reception of signals. In embodiments of the invention, communication interface 23 is configured to allow communication according to a 2G/3G/4G cellular communication system and/or a non-cellular communication system, such as for instance a WLAN network. Nevertheless, the communication route between mobile terminal 2 and server 3 may equally well at least partially comprise wire-bound portions. For instance, server 3 may be connected to a back-bone of a wireless communication system (associated with mobile terminal 2) via a wire-bound system such as for instance the internet.

Processor 20 further controls a user interface 24 configured to present information to a user of apparatus 2 and/or to receive information from such a user. Such information may for instance comprise information on a position estimate determined based on the determined model or model parameters. User interface 24 may for instance be the standard user interface via which a user of apparatus 2 with apparatus 2 to control other functionality thereof, such as making phone calls, browsing the Internet, etc.

Processor 20 may further control an optional GNSS interface 25 configured to receive positioning information of an GNSS such as Global Positioning System (GPS), Galileo, Global Navigation Satellite System (i.e. "Globalnaja Nawigazionnaja Sputnikowaja Sistema", GLONASS) and Quasi-Zenith Satellite System (QZSS). It should be noted that, even in case apparatus 2 has a GNSS interface 25, the user of apparatus 2 or for instance the mobile terminal comprising apparatus 2 can still benefit from using positioning technologies based on other sources, such as transmitters of communication systems (e.g. transmitters 4-2, 4-3), since these technologies may reduce time-to-first-fix and/or lower power consumption as compared to GNSS-based positioning. Also, and perhaps even more important, positioning technologies based on signals from transmitters of communication systems work indoors, which is generally a challenging environment for GNSS-based technologies.

The components 21-25 of apparatus 2 may for instance be connected with processor 20 by means of one or more serial and/or parallel busses.

Figure 3:
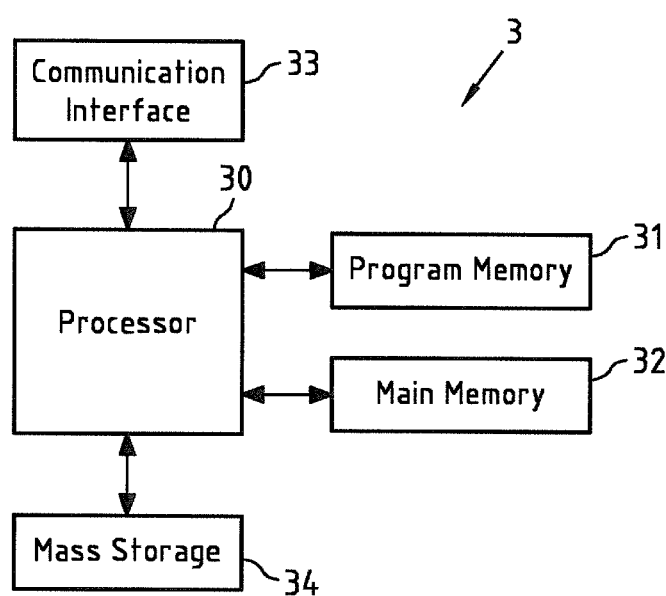
FIG. 3 is a block diagram of the apparatus 3 of FIG. 1.

FIG. 3 is a block diagram of an apparatus, which is also an example embodiment of an apparatus 3 according to the invention. Apparatus 3 for instance is or forms a part (e.g. as a module) of a server, e.g. server 3 of FIG. 1. Generally, only one of the apparatuses 2 and 3 needs to be an exemplary embodiment of an apparatus according to the invention. For instance, in a scenario, where apparatus 3 is an example embodiment of an apparatus according to the invention, the apparatus 2 may be a standard mobile terminal.

Apparatus 3 comprises a processor 30. Processor 30 may represent a single processor or two or more processors, which are for instance at least partially coupled, for instance via a bus. Processor 30 executes a program code stored in program memory 31 (for instance program code causing apparatus 3 to perform the example embodiment of a method according to the invention (as for instance described below with reference to FIG. 4), when executed on processor 30). Processor 30 further interfaces with a main memory 32 (for instance acting as a working memory) and a mass storage 34, which may for instance store measurement data on a location-specific quantity of a signal transmitted by a transmitter and location information associated with said measurement data on said location-specific quantity. The measurement data and the location information may for instance be stored in a database. Further, the server 3 may also be able to store a model (e.g. respective model parameters of the model), e.g. in a mass storage 34. The model or the model parameters may be sent to and received by the mobile terminal 2.

FIG. 4 is a flow chart 400 illustrating an exemplary embodiment of the method according to the invention for instance performed by the apparatus 2 and/or apparatus 3 of FIG. 2 and FIG. 3.

The following example embodiment of the method according to the invention described with respect to FIG. 4 considers the case of a building with multiple floors. However, the given method can be generalized for an outdoor scenario (e.g. by considering the outdoor environment as a 1-floor building and neglecting losses due to the signal propagation through different floors by neglecting the floor-loss parameter). Further, in the following embodiment, the signal is assumed to be a signal from an Access Point (AP). However, the embodiment is also applicable for other transmitters, e.g. a node of a cellular system or network. Further, in the following embodiment, the location-specific quantity of the signal is a received signal strength (RSS) and accordingly the measurement data is an RSS measurement. The embodiment can, however, be transferred to other location-specific quantities, e.g. timing measurements etc. Further, the following embodiment, may generally also be performed with different models and algorithms.

According to the exemplary model, the RSS measurement $P(\underline{x})$ at any location $\underline{x}=[x\ y\ z]^T$, where the x, y and z are the x-coordinate, y-coordinate, and the z-coordinate, is assumed to be defined as $$P(\underline{x})=G(\underline{x})+\Psi(\underline{x})+v, \quad (1)$$

where $G(\underline{x})$ is a first location-specific function (also referred to as global trend function) for the RSS value, $\Psi(\underline{x})$ is a zero mean second location-specific function (also referred to as spatially varying function) and v is zero mean white Gaussian measurement noise. Here, the spatially varying function $\Psi(\underline{x})$ is defined in terms of a covariance function $\Phi(d)$, where the distance d defines the covariance between two RSS values separated by d. One commonly used covariance function with spatially varying RSS data is the exponential function described as $$\Phi(d)=\sigma_0^2 \exp(-d/d_{corr}), \quad (2)$$

where $\sigma_0$ is the square root of the covariance at zero distance, and $d_{corr}$ is a design parameter affecting the shape of the covariance function. The larger is the parameter $d_{corr}$ the more nearby measurements correlate. In the presented implementation it is assumed that the AP antenna is omnidirectional (i.e., the antenna radiates equally to all directions). However, in case of directional antennas, the trend function $G(\underline{x})$ would depend also on the angle between the measurement location and the AP location. Notice that since $\Psi(\underline{x})$ and v are both zero mean functions, $G(\underline{x})$ describes the statistical average of the RSS values at each location.

Whereas the global trend function $G(\underline{x})$ captures the distance-dependent RSS value average, the spatially varying function $\Psi(\underline{x})$ models the spatial RSS variations due to the different types of obstacles in the radio path. Since these functions are assumed to be independent from each other, the estimation process is performed in two different stages:

In a first stage, the global trend function $G(\underline{x})$ is estimated (as shown in step 404). This includes the estimation of the AP location and the corresponding path loss parameters and the evaluation of the reliability of the estimates to decide whether to continue to the next stage.

In a second stage, the spatially varying function $\Psi(\underline{x})$ is estimated (as shown in step 407). This includes the estimation of the spatially correlated shadowing function, which is estimated from the residual of observed RSS after the trend function has been removed.

After these, the final step is then to combine the stages 1 and 2 to get the final RSS estimates and their uncertainty levels.

1. Estimation of the Global Trend Function $G(\underline{x})$

Assuming a common log-distance path loss model, the average observed RSS level at location $\underline{x}$ can be determined as $$G_0(\underline{x})=A-10n\ \log_{10}(\|\underline{x}-\underline{x}_{AP}\|), \quad (3)$$

where $\|.\|$ denotes the vector norm and $\|\underline{x}-\underline{x}_{AP}\|$ gives the Euclidian distance between the location $\underline{x}$ and the location of AP $\underline{x}_{AP}=[x_{AP}\ y_{AP}\ z_{AP}]^T$, A is the path loss constant describing the RSS level (in dB) at 1 m distance, and n is the path loss exponent describing the slope of the function (i.e., how fast the RSS drops per distance unit). In indoor scenario the propagation environment in horizontal direction and vertical direction can vary significantly. For example, typically the signal penetration loss through floors is considerably higher compared to the penetration loss through walls. Therefore, it is beneficial to consider an additional floor loss parameter $F(\Delta f)$ in the Equation (3) as $$G(\underline{x})=G_0(\underline{x})-F(\Delta f), \quad (4)$$

where $\Delta f$ is an integer describing the difference of floors between the AP location and the observation location. One approach to model the floor-loss is to use a constant floor loss model, in which case the floor loss function is given as $$F(\Delta f)=L_f \Delta f, \quad (5)$$

where $L_f$ is the floor loss (in dB) between two consecutive floors. Now, substituting the floor loss into the Equation (4), and reformatting the $\Delta f$ according to $\underline{x}$ and $\underline{x}_{AP}$, the overall trend function becomes $$G(\underline{x})=A-10n\ \log_{10}(\|\underline{x}-\underline{x}_{AP}\|)-(L_f|z-z_{AP}|)/h, \quad (6)$$

where h is the floor height (assumed to be known and constant between floors) and |.| denotes the absolute value. Hence, the value of the trend function depends on four unknown parameters: A, n, $\underline{x}_{AP}$ and $L_f$, which are to be estimated. It is also important to notice that the parameter $\underline{x}_{AP}$ is a 3-dimensional vector.

Assuming that N RSS measurements $P_i(x_i)$ are obtained from locations $\underline{x}_i$ with i=0 . . . N−1, the estimation of the unknown parameters can be performed with a non-linear least squares algorithm. However, without providing any a-priori information on the estimated parameters, the estimate values might become senseless with respect to the known physical radio propagation environment and typical radio network parameters. For example, the transmission power of radio transceivers is known to be set at certain level so that some sensible coverage area is achieved, but the maximum values restricted in legislation are not exceeded. Nonetheless, one or more of the following a-priori information on the unknown parameters may be available:

1. Regarding model parameter A (the RSS at 1 m distance): the model parameter A is highly dependent on the transmission power, which is restricted based on the legislation and/or minimum coverage area requirements. If free space path loss is assumed for the first meter, the model parameter A can be estimated as the effective transmission power minus the 1 meter path loss, for example.
2. Regarding model parameter n (path loss exponent): n is dependent on the radio propagation environment. Typical values for indoor and outdoor case can be found from the literature, for example.
3. Regarding the model parameter $L_f$ (floor loss, only required in indoor scenario): $L_f$ is dependent on the building and the floor plan. Typical values can be found from the literature, for example.

Figure 5:
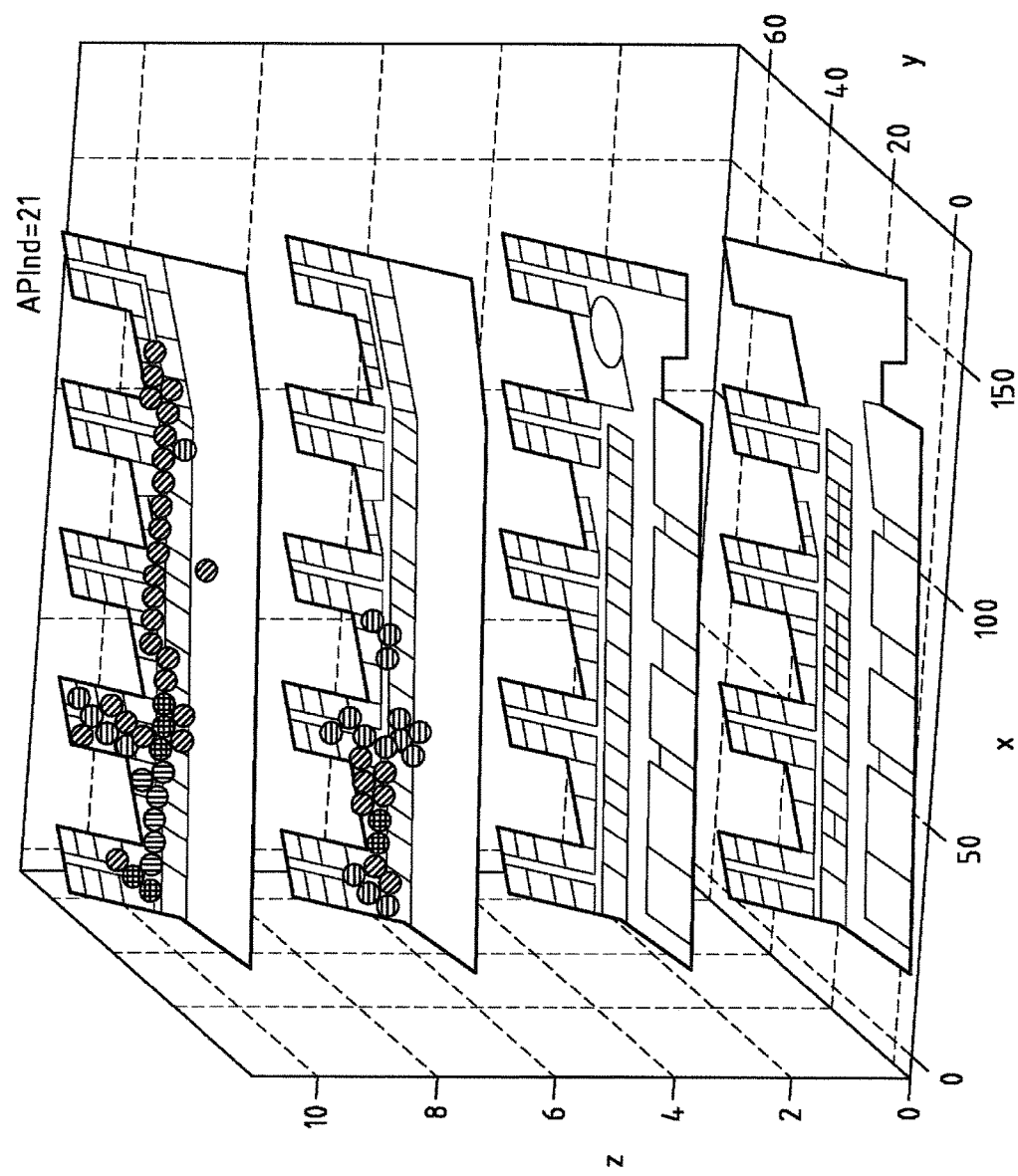
FIG. 5 is a schematic three-dimensional illustration of the obtained values of received signal strength measured at different locations of a building with multiple floors.

From the unknown model parameters the AP location parameter $\underline{x}_{AP}$ is assumed to be the only one without any (direct) a-priori information. An example of RSS measurement data for one AP inside a building with 4 floors is shown in FIG. 5, wherein the floorplan of the four floors extending in the x/y-direction and stacked upon each other in the z-direction is shown and the kind of hatching symbolizes the magnitude of the measured received signal strength (i.e. an RSS power map). For illustrative purposes, the measured received signal strength is only provided for four different value intervals.

The data shown in FIG. 5 may be measured by mobile terminal 2, for example and provided to server 3. Server 3 may thus obtain measurement data on the RSS of the transmitter 4-1 and location information associated with said measurement data. This corresponds to steps 401 and 402 in chart 400 in FIG. 4.

Non-linear least square problems can be solved iteratively by using the Gauss-Newton algorithm for example in [1]. This requires formulation of the Jacobian matrix J of size N×6. More generally speaking, if the number of model parameters for the first location-specific function is M, the Jacobian matrix has the size N×M. The Jacobian matrix defines the analytical partial derivatives of the trend function in Equation (6) as $$J = \begin{bmatrix} \frac{\partial P_1(\underline{x}_1)}{\partial A} & \frac{\partial P_1(\underline{x}_1)}{\partial n} & \frac{\partial P_1(\underline{x}_1)}{\partial \underline{x}_{AP}} & \frac{\partial P_1(\underline{x}_1)}{\partial L_f} \\ \vdots & \vdots & \vdots & \vdots \\ \frac{\partial P_N(\underline{x}_N)}{\partial A} & \frac{\partial P_N(\underline{x}_N)}{\partial n} & \frac{\partial P_N(\underline{x}_N)}{\partial \underline{x}_{AP}} & \frac{\partial P_N(\underline{x}_N)}{\partial L_f} \end{bmatrix} \quad (7)$$

The above partial derivatives may be derived analytically. Then, it is possible to run the below algorithm. However, it is also possible to evaluate the Jacobian matrix numerically during the estimation process. The Gauss-Newton algorithm can be described as follows:

1. Define the a-priori estimates for each model parameter and substitute those in the vector $\underline{m}_0$ of length 6. Furthermore, approximate the parameter covariance matrix $\Sigma_0$ of size 6×6 to describe parameter uncertainties and dependencies. This corresponds to step 403 in chart 400 in FIG. 4.
2. Define the a-priori values to be the first parameter estimate as $\underline{m}_{est} = \underline{m}_0$ and $\Sigma_{est} = \Sigma_0$.
3. Compute partial derivatives in the Jacobian matrix J by using the current estimate values $\underline{m}_{est}$.
4. Compute the next step for the parameter estimate update as $$\Delta \underline{m} = -(\Sigma_0^{-1} + J^T \Sigma_{RSS} J)^{-1}(\Sigma_0^{-1}(\underline{m}_{est} - \underline{m}_0) + J^T \Sigma_{RSS} \underline{r}), \quad (8)$$

where $\Sigma_{RSS}$ is a covariance matrix of the RSS measurements (discussed later on), and r is the vector of error between the current model trend estimate $G_{est}(\underline{x}_i)$ and the measurements $P_i(\underline{x}_i)$ defined by $$\underline{r}_i = G_{est}(\underline{x}_i) - P_i(\underline{x}_i), i=1 \ldots N, \quad (9)$$

where $$G_{est}(\underline{x}_i) = A_{est} - 10 n_{est} \log_{10}(\|\underline{x}_i - \underline{x}_{AP,est}\|) - (L_{f,est}|z - z_{AP,est}|)/h, \quad (10)$$

and the estimated parameters are taken from $\underline{m}_{est} = [A_{est}\ n_{est}\ \underline{x}_{AP,est}^T\ L_{f,est}]^T$.
5. Define the new parameter estimate as $\underline{m}_{est} = \underline{m}_{est} + \alpha \Delta \underline{m}$, where a is the design parameter for the step length (can be fixed or modified adaptively).
6. If the step length $\|\Delta \underline{m}\|$ is larger than a threshold, e.g. a desired stopping tolerance parameter, then continue with the next iteration from the step number 3. Otherwise consider the current trend estimate $G_{est}(\underline{x}_i)$ as the final trend estimate, step 404 of FIG. 4. Finally, the covariance matrix of the estimates can be computed as $\Sigma_{est} = (\Sigma_0^{-1} + J^T \Sigma_{RSS} J)^{-1}$, step 405 of FIG. 4

Since the convergence of the algorithm is based on the partial derivatives, the estimated parameters converge towards a local maximum. Therefore, depending on the scenario, in some cases it could be beneficial to repeat the algorithm with different sets of initial guesses of the unknown model parameters (at least the AP location $\underline{x}_{AP}$). After the algorithm has been repeated for the different initial guesses, there is a higher change to find the global maximum by selecting the estimated model with the smallest modeling error r (i.e., the model with best fit with the measurement data). This repetition is illustrated by the arrow from step 404 back to step 403 in chart 400 in FIG. 4.

Figure 6:
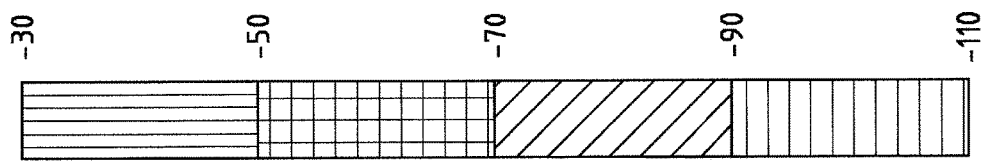
FIG. 6 is a schematic three-dimensional illustration of the received signal strength according to the first location-specific function of the model.
Figure 6:
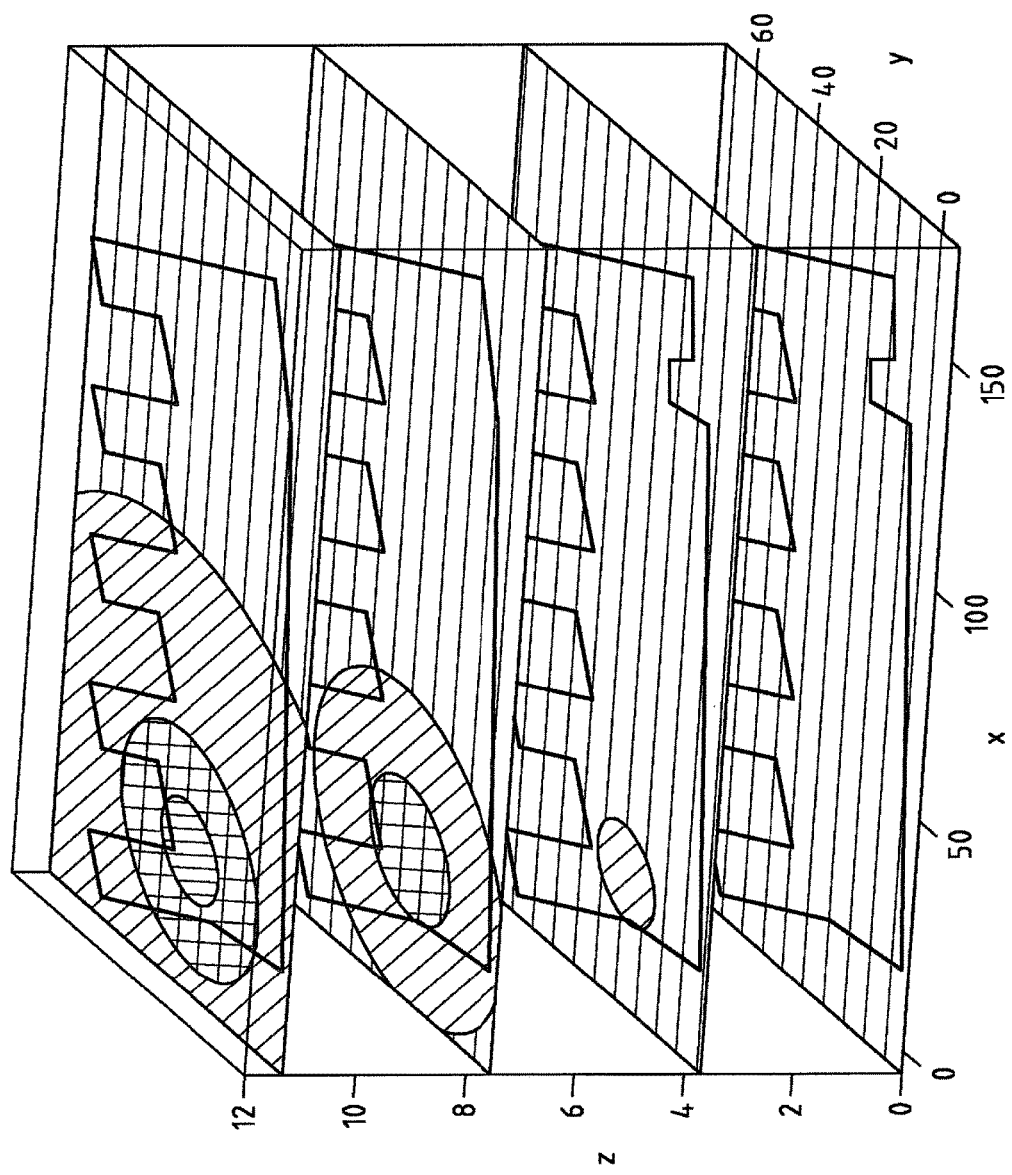

FIG. 6 shows the estimated global trend function as estimated from the previously shown measurement data given in FIG. 5, wherein the kind of hatching illustrates the magnitude of the modeled signal strength. For illustrative purposes, the floor plan is simplified and the signal strength is only provided for four different value intervals.

The diagonal elements of the parameter covariance matrix $\Sigma_{est}$, as computed in step 405 of FIG. 4, indicate the variances of the estimated parameters. From here it is possible to observe whether the estimated model is reliable enough to continue to the next stage of the estimation process or should the process be stopped here, step 406 of FIG. 4. For example, the number of measurements N might be too low or the measurement location geometry might be very poor, in which case the AP location estimate cannot be reliably estimated. In this case proceeding to the stage 2 in the estimation process is not desirable, since the RSS estimate variances become insignificantly large.

2. Estimation of the Spatially Varying Function $\Psi(\underline{x})$

The spatially varying function is obtained by studying the residual of the measurements after the trend function has been removed. Therefore, based on the Equation (1), the residual RSS measurements can be defined as $$\Psi(\underline{x}_i) = P_i(\underline{x}_i) - G_{est}(\underline{x}_i). \quad (11)$$

Now, the target is to estimate the spatially varying function $\Psi(\underline{x})$ at any desired location $\underline{x}$. This can be done by exploiting the covariance between the RSS measurements. Based on the previously defined covariance function (I,d), the covariance matrix of the residual RSS measurements can be obtained as $$\sum_{RSS} = \begin{bmatrix} \Phi(0) & \Phi(\|\underline{x}_1 - \underline{x}_2\|) & \ldots & \Phi(\|\underline{x}_1 - \underline{x}_N\|) \\ \Phi(\|\underline{x}_2 - \underline{x}_1\|) & \Phi(0) & & \vdots \\ \vdots & & \ddots & \Phi(\|\underline{x}_{N-1} - \underline{x}_N\|) \\ \Phi(\|\underline{x}_N - \underline{x}_1\|) & \ldots & \Phi(\|\underline{x}_N - \underline{x}_{N-1}\|) & \Phi(0) \end{bmatrix} \quad (12)$$

This method has been generally referred as Gaussian process regression or simple Kriging. Although the process can be performed both in 2D or 3D, only the 2D scenario is considered here, since the only difference is in the definition of distance d in the covariance function. In practice, the 2D approach corresponds to the outdoor scenario or to the indoor scenario with floor-wise data processing. Nonetheless, as mentioned before, typically the radio propagation properties are very different in vertical direction compared to the horizontal direction. This should be taken into account in definition of the covariance matrix $\Sigma_{RSS}$, for example, by decreasing the parameter $d_{corr}$ in Equation (2) in vertical direction compared to the horizontal direction.

The covariance matrix of the estimated residual function, given by Equation (11), includes the original RSS measurement covariance and the error of the global trend estimate. This error can be formulated as $$\Sigma_{tot} = \Sigma_{RSS} + \Sigma_G \quad (13)$$

where $\Sigma_G$ a diagonal matrix whose diagonal elements are taken from the diagonal of matrix $J \Sigma_{est} J^T$. Now, for any location $\underline{x}_0$, the spatially varying function can be written as the linear combination of the spatially varying components at known locations:

$$\Psi_{est}(\underline{x}_0) = \Sigma_{i=1 \ldots N} w_i \Psi(\underline{x}_i), \quad (14)$$

where $$w_i = \Sigma_{tot}^{-1} \Phi(\|\underline{x}_0 - \underline{x}_i\|). \quad (15)$$

Thus the second location-specific function of the model is determined, step 407 of FIG. 4. Furthermore, the variance of the estimate can be defined as $$\sigma_\Psi^2 = \Phi(0) - \Sigma_{i=1 \ldots N} w_i \Phi(\|\underline{x}_0 - \underline{x}_i\|). \quad (16)$$

It is worth noticing that the variance of the estimate will increase, if there are no measurements close to the estimated location and vice versa. This is intuitively clear–the interpolation/extrapolation gets more and more uncertain as the distance to the actual measurement location increases.

After the global trend estimate (first location-specific function) and the spatially varying function (second location-specific function) are estimated, the overall RSS estimate at an arbitrary location $\underline{x}_0$ can be found by combining the previous results as $$P_{est}(\underline{x}_0) = G_{est}(\underline{x}_0) + \Psi(\underline{x}_0). \quad (17)$$

The overall variance of the RSS estimate is the combined variance of the global trend estimate and the spatially varying function estimate as $$\sigma_{x0}^2 = \sigma_G^2 + \sigma_\Psi^2, \quad (18)$$

where $\sigma_G^2 = J_{x0} \Sigma_{RSS} J_{x0}^T$ and $J_{x0}$ is 1×4 Jacobian matrix calculated for the location $\underline{x}_0$.

Figure 7:
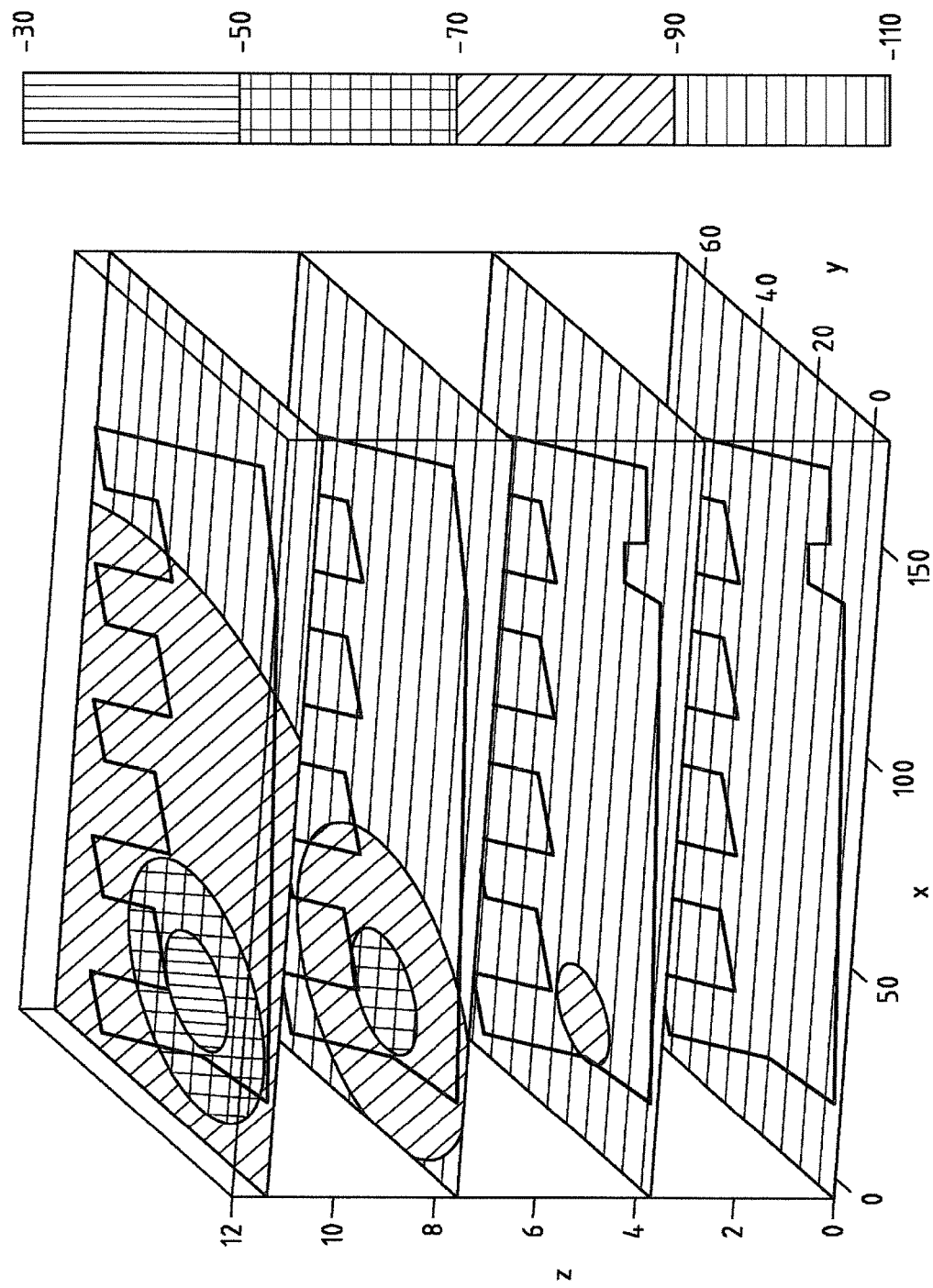
FIG. 7 is a schematic three-dimensional illustration of the determined received signal strength according to the model.
Figure 8:
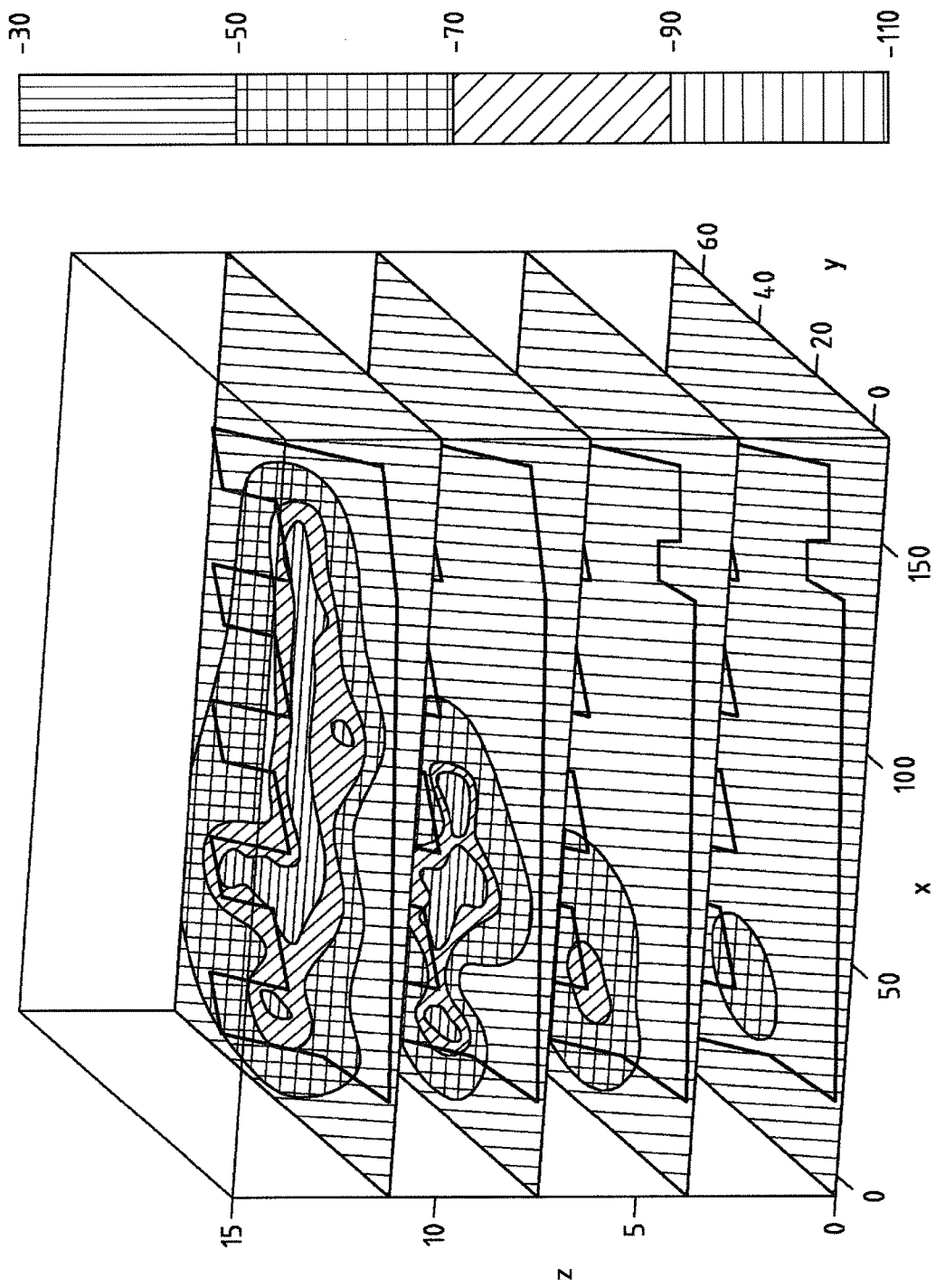
FIG. 8 is a schematic three-dimensional illustration of the variance of the determined signal strength values of FIG. 3.

The final estimated RSS field (global path loss trend+ spatially varying component) is shown in FIG. 7, which illustrates the interpolated and extrapolated RSS values for the previously shown measurements given in FIG. 5, wherein the kind of hatching illustrates the magnitude of the received signal strength. Moreover, the corresponding variance estimates are illustrated in FIG. 8, wherein the kind of hatching illustrates the magnitude of the variance estimates. Again, for illustrative purposes, the floor plan is simplified and the signal strength and the variances are only provided for four different value intervals It can be noticed that the variance increases whenever the estimate location is moved further from the known measurement locations. Moreover, the variance is also at higher level around the AP location estimate (the part in FIG. 7 with the highest values) due to uncertainties in the global trend function.

The model (e.g. the final estimated RSS filed) or model parameters or parts thereof may than be transferred back from server 4 to mobile terminal 2. Mobile terminal 2 may then use the model or model parameters (or parts thereof) for determining or estimating the location or position of the mobile terminal 2.

This above embodiment shows how the proposed estimation method is capable of filling the measurement gaps with sensible RSS values and also indicates the uncertainties related to the estimation in an intuitively clear manner.

Contrary to the earlier solutions, the method proposed is able to estimate the essential path loss parameters and the AP location in 3D indoor environments with multiple floors including floor losses. The whole process can be done without substantial knowledge of the model parameters, such as the AP location. In addition to the path loss parameter estimation, the overall RSS estimates are provided by using the spatial covariance between the RSS measurements. This enables consideration of shadowing in the estimation process, which improves the estimation quality whenever nearby RSS measurements are available.

The information on the uncertainty of the RSS estimation process can be crucial for a later positioning stage. Unlike the solutions from the state of the art, the overall uncertainty is delivered including the uncertainty of the path loss parameter estimates and the AP location estimate, as well as the uncertainty of the spatial interpolation. No heuristic approach is required here, but the delivered variance estimate is directly based on the available RSS measurements and on the assumptions related to the path loss parameters and the distance based covariance function.

Embodiments of different aspects of the invention may therefore:
- decrease the requirements of the learning data collection campaigns, as less data can be collected in less parts of the building;
- enable interpolation and extrapolation in 3D indoor scenario with floor losses;
- perform interpolation and extrapolation jointly without a need to make a difference between them;
- consider the shadowing in the estimation process;
- allows the estimates of the location-specific quantity (e.g. RSS estimates) to follow a locally varying shadowing function, and thus, to mimic building floor plans and different physical obstacles in the signal path;
- deliver uncertainties for the estimates of the location-specific quantity (e.g. RSS estimates);
- improve the subsequent positioning processes resulting in better position estimates; take measurement covariance into account;
- not require pre-processing or whitening of learning data regarding nearby measurement (e.g. mapping multiple RSS measurements into a single fingerprint);
- not require heuristic parameters in the design;
- benefit from the fact that the methods may be based on the assumptions on the real life physical radio propagation environment.

Figure 9:
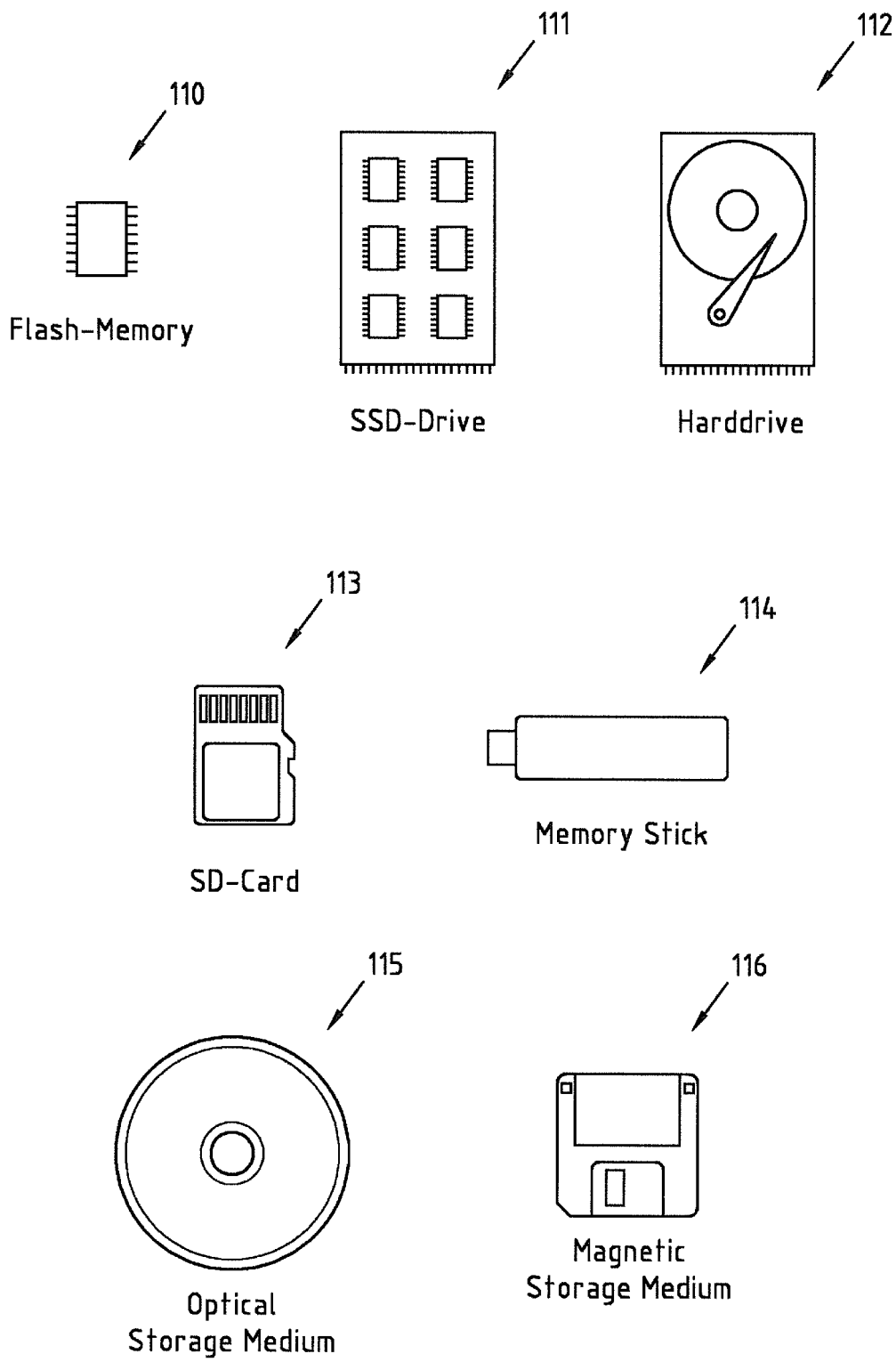
FIG. 9 a schematic illustration of examples of tangible storage media according to the present invention.

FIG. 9 illustrates examples of tangible storage media that may for instance be used to implement program memory 21 of FIG. 2 and/or program memory 31 of FIG. 3. To this end, FIG. 9 displays a flash memory 110, which may for instance be soldered or bonded to a printed circuit board, a solid-state drive 111 comprising a plurality of memory chips (e.g. Flash memory chips), a magnetic hard drive 112, a Secure Digital (SD) card 113, a Universal Serial Bus (USB) memory stick 114, an optical storage medium 115 (such as for instance a CD-ROM or DVD) and a magnetic storage medium 116.

Any presented connection in the described embodiments is to be understood in a way that the involved components are operationally coupled. Thus, the connections can be direct or indirect with any number or combination of intervening elements, and there may be merely a functional relationship between the components.

Further, as used in this text, the term 'circuitry' refers to any of the following:
(a) hardware-only circuit implementations (such as implementations in only analog and/or digital circuitry)
(b) combinations of circuits and software (and/or firmware), such as: (i) to a combination of processor(s) or (ii) to portions of processor(s)/software (including digital signal processor(s)), software, and memory(ies) that work together to cause an apparatus, such as a mobile phone, to perform various functions) and (c) to circuits, such as a microprocessor(s) or a portion of a microprocessor(s), that re-quire software or firmware for operation, even if the software or firmware is not physically present.

This definition of 'circuitry' applies to all uses of this term in this text, including in any claims. As a further example, as used in this text, the term 'circuitry' also covers an implementation of merely a processor (or multiple processors) or portion of a processor and its (or their) accompanying software and/or firmware. The term 'circuitry' also covers, for example, a baseband integrated circuit or applications processor integrated circuit for a mobile phone.

Any of the processors mentioned in this text, in particular but not limited to processors 20 and 30 of FIGS. 2 and 3, could be a processor of any suitable type. Any processor may comprise but is not limited to one or more microprocessors, one or more processor(s) with accompanying digital signal processor(s), one or more processor(s) without accompanying digital signal processor(s), one or more special-purpose computer chips, one or more field-programmable gate arrays (FPGAS), one or more controllers, one or more application-specific integrated circuits (ASICS), or one or more computer(s). The relevant structure/hardware has been programmed in such a way to carry out the described function.

Moreover, any of the actions described or illustrated herein may be implemented using executable instructions in a general-purpose or special-purpose processor and stored on a computer-readable storage medium (e.g., disk, memory, or the like) to be executed by such a processor. References to 'computer-readable storage medium' should be understood to encompass specialized circuits such as FPGAs, ASICs, signal processing devices, and other devices.

It will be understood that all presented embodiments are only exemplary, and that any feature presented for a particular exemplary embodiment may be used with any aspect of the invention on its own or in combination with any feature presented for the same or another particular exemplary embodiment and/or in combination with any other feature not mentioned. It will further be understood that any feature presented for an example embodiment in a particular category may also be used in a corresponding manner in an example embodiment of any other category.

REFERENCES

[1] Nurminen, H.; Talvitie, J.; Ali-Loytty, S.; Muller, P.; Lohan, E.; Piche, R.; Renfors, M., "Statistical path loss parameter estimation and positioning using RSS measurements in indoor wireless networks," Indoor Positioning and Indoor Navigation (IPIN), 2012 International Conference on, vol., no., pp. 1, 9, 13-15 Nov. 2012.

The invention claimed is:

1. A method performed by at least one apparatus, said method comprising:
    obtaining measurement data on a location-specific quantity of a signal transmitted by a transmitter;
    obtaining location information associated with said measurement data on said location-specific quantity; and
    determining, based on said obtained measurement data and said obtained location information, one or more model parameters of a model describing said location-specific quantity in dependence of location, wherein said model assumes a location dependence of said location-specific quantity in a form of a linear combination of a first location-specific function and a second location-specific function,
    wherein said determination of said model parameters at least in part comprises:
    determining a reliability of at least a part of said determined model parameters associated with said first location-specific function; and
    determining at least a part of said model parameters associated with said second location-specific function only in an instance in which said reliability of at least a part of said determined model parameters associated with said first location-specific function satisfies a reliability threshold.

2. The method according to claim 1, wherein said determining of said model parameters comprises
    determining at least a part of said model parameters associated with said first location-specific function; and
    subsequently determining at least a part of said model parameters associated with said second location-specific function.

3. The method according to claim 1, wherein said first location-specific function describes a global trend of said location dependence of said location-specific quantity in said model.

4. The method according to claim 1, wherein said first location-specific function is based on a radio propagation model.

5. The method according to claim 1, wherein a-priori information is imposed on at least a part of said model parameters associated with said first location-specific function.

6. The method according to claim 5, wherein said a-priori information is based on at least one of:
    legislative requirements;
    technical requirements; and
    empirical values.

7. The method according to claim 1, wherein a-priori information is not directly imposed on at least one of said model parameters associated with said first location-specific function.

8. The method according to claim 1, wherein said first location-specific function accounts for a different propagation of the signal in the vertical direction.

9. The method according to claim 1, wherein said determination of said model parameters associated with said first location-specific function comprises
    choosing starting values for said model parameters associated with said first location-specific function; and
    using an iterative algorithm for determining said model parameters associated with said first location-specific function.

10. The method according to claim 9, wherein said determining of said model parameters associated with said first location-specific function is repeated with different starting values of said model parameters associated with said first location-specific function.

11. The method according to claim 1, wherein said model parameters
    associated with said first location-specific function comprise at least one of:
    a path loss constant;
    a pass loss exponent;
    a location of an said transmitter; and
    a floor loss parameter.

12. The method according to claim 1, wherein said second location-specific function describes local variations of said location dependence of said location-specific quantity in said model.

13. The method according to claim 1, wherein said second location-specific function is based on a covariance function.

14. The method according to claim 1, wherein said determining of said model parameters of said second location-specific function is based on residuals of at least a part of said obtained measurement data on said location-specific quantity.

15. The method according to claim 14, wherein said second location-specific function is a weighted linear combination of said residuals of said obtained measurement data on said location-specific quantity.

16. The method according to claim 1, wherein said transmitter is part of one of:
a cellular communication system and a non-cellular communication system.

17. The method according to claim 1, wherein said measurement data on
said location-specific quantity is representative of or comprises at least one of:
a received signal strength;
a timing measurement;
an angle of arrival;
a timing measurement,
a magnetic field strength and/or direction; and
an identification of said transmitter.

18. The method according to claim 1, wherein said location information is
derived from at least one of:
a Global Navigation Satellite System (GNSS);
a Wireless Local Area Network (WLAN) system;
a Bluetooth (BT) system;
a Radio Frequency Identification (RFID) system;
a cellular network system;
one or more sensors; and
a manual input.

19. A computer readable storage medium in which computer program code is stored, the computer program code when executed by a processor causing an apparatus to:
obtain measurement data on a location-specific quantity of a signal transmitted by a transmitter;
obtain location information associated with said measurement data on said location-specific quantity; and
determine, based on said obtained measurement data and said obtained location information, one or more model parameters of a model describing said location-specific quantity in dependence of location, wherein said model assumes a location dependence of said location-specific quantity in a form of a linear combination of a first location-specific function and a second location-specific function,
wherein said determination of said model parameters at least in part comprises:
determining a reliability of at least a part of said determined model parameters associated with said first location-specific function; and
determining at least a part of said model parameters associated with said second location-specific function only in an instance in which said reliability of at least a part of said determined model parameters associated with said first location-specific function satisfies a reliability threshold.

20. An apparatus configured to realize or comprising respective means for realizing the method of claim 1.

21. An apparatus comprising at least one processor and at least one memory including computer program code, the at least one memory and the computer program code configured to, with the at least one processor, cause an apparatus at least to:
obtain measurement data on a location-specific quantity of a signal transmitted by a transmitter;
obtain location information associated with said measurement data on said location-specific quantity; and
determine, based on said obtained measurement data and said obtained location information, one or more model parameters of a model describing said location-specific quantity in dependence of location, wherein said model assumes a location dependence of said location-specific quantity in a form of a linear combination of a first location-specific function and a second location-specific function,
wherein said determination of said model parameters at least in part comprises:
determining a reliability of at least a part of said determined model parameters associated with said first location-specific function; and
determining at least a part of said model parameters associated with said second location-specific function only in an instance in which said reliability of at least a part of said determined model parameters associated with said first location-specific function satisfies a reliability threshold.

22. The apparatus according to claim 21, wherein the apparatus is one of a server or a part thereof; and
a mobile terminal or a part thereof.

23. A system comprising an apparatus according to claim 21, and at least one of:
a mobile device configured to provide said measurement data on said location-specific quantity of said signal from said transmitter and to provide said location information associated with said measurement data on said location-specific quantity;
a memory configured to store said measurement data on said location-specific quantity of said signal from said transmitter and to store location information associated with said measurement data on said location-specific quantity; and
a memory configured to store said determined model parameters of said model describing said location-specific quantity in dependence of location.

24. The method according to claim 1, wherein said model further assumes a location independent component which is a zero mean variable.

* * * * *